United States Patent
McDougle

(10) Patent No.: US 9,277,611 B2
(45) Date of Patent: Mar. 1, 2016

(54) LED DRIVER WITH HIGH DIMMING COMPATIBILITY WITHOUT THE USE OF BLEEDERS

(71) Applicant: TerraLUX, Inc., Longmont, CO (US)

(72) Inventor: Anthony N. McDougle, Lafayette, CO (US)

(73) Assignee: TerraLUX, Inc., Longmont, CO (US)

( * ) Notice: Subject to any disclaimer, the term of this patent is extended or adjusted under 35 U.S.C. 154(b) by 23 days.

(21) Appl. No.: 14/215,805

(22) Filed: Mar. 17, 2014

(65) Prior Publication Data

US 2015/0264758 A1    Sep. 17, 2015

(51) Int. Cl.
   *H05B 33/08*    (2006.01)
   *H02M 3/335*   (2006.01)
   *H02M 5/257*   (2006.01)
   *H02M 1/00*    (2007.01)

(52) U.S. Cl.
   CPC ....... *H05B 33/0815* (2013.01); *H02M 3/33507* (2013.01); *H05B 33/0845* (2013.01); *H02M 5/257* (2013.01); *H02M 2001/007* (2013.01)

(58) Field of Classification Search
   None
   See application file for complete search history.

(56) References Cited

U.S. PATENT DOCUMENTS

| | | | |
|---|---|---|---|
| 4,104,562 A | 8/1978 | DiCola | |
| 4,376,969 A | 3/1983 | Bedard et al. | |
| 4,538,092 A | 8/1985 | Goralnik | |
| 4,628,230 A | 12/1986 | Krokaugger | |
| 5,629,607 A | 5/1997 | Callahan et al. | |
| 6,218,787 B1 | 4/2001 | Murcko et al. | |
| 6,980,122 B2 | 12/2005 | Novikov | |
| 7,109,665 B2 | 9/2006 | Green | |
| 7,271,550 B2 | 9/2007 | Vanderzon | |
| 7,279,853 B2 | 10/2007 | Chong | |
| 7,667,408 B2 | 2/2010 | Melanson et al. | |
| 7,804,256 B2 | 9/2010 | Melanson | |
| 7,852,017 B1 | 12/2010 | Melanson | |
| 7,868,561 B2 | 1/2011 | Weightman et al. | |
| 7,902,769 B2 | 3/2011 | Shteynberg et al. | |
| 7,906,916 B2 | 3/2011 | Gehman | |
| 8,022,683 B2 | 9/2011 | Thompson et al. | |
| 8,324,822 B2 | 12/2012 | Peng | |

(Continued)

FOREIGN PATENT DOCUMENTS

| EP | 0435597 A2 | 7/1991 |
|---|---|---|
| GB | 2435724 A | 9/2007 |

(Continued)

OTHER PUBLICATIONS

On Semiconductor, "Configuring the NCL30000 for TRIAC Dimming", Publication Order Number: AND8448/D, Rev. 1, Sep. 2012, pp. 1-9.

(Continued)

*Primary Examiner* — Douglas W Owens
*Assistant Examiner* — Dedei K Hammond
(74) *Attorney, Agent, or Firm* — Neugeboren O'Dowd PC

(57) ABSTRACT

A switching converter detects when a dimmer circuit supplying power to the switching converter changes from a conducting state to a nonconducting state or from a nonconducting state to a conducting state; an equivalent input resistance of the switching converter is changed to a first, higher value when the dimmer circuit is in the conducting state and to a second, lower value when the dimmer circuit is in the nonconducting state, thereby drawing a minimum current from the dimmer circuit while the dimmer circuit is in the nonconducting state.

13 Claims, 6 Drawing Sheets

(56) References Cited

U.S. PATENT DOCUMENTS

| | | |
|---|---|---|
| 2008/0203934 A1 | 8/2008 | Van Meurs |
| 2008/0258647 A1 | 10/2008 | Scianna |
| 2008/0309252 A1 | 12/2008 | Guanrong et al. |
| 2010/0237790 A1 | 9/2010 | Peng |
| 2011/0068704 A1 | 3/2011 | McKinney |
| 2011/0121754 A1 | 5/2011 | Shteynberg et al. |
| 2011/0266968 A1* | 11/2011 | Bordin et al. ............ 315/287 |
| 2011/0291583 A1 | 12/2011 | Shen |
| 2012/0026761 A1 | 2/2012 | Young |
| 2012/0049752 A1 | 3/2012 | King et al. |
| 2012/0056553 A1 | 3/2012 | Koolen et al. |
| 2012/0112651 A1 | 5/2012 | King et al. |
| 2012/0139431 A1 | 6/2012 | Thompson et al. |
| 2012/0169243 A1 | 7/2012 | Lin et al. |
| 2012/0176826 A1 | 7/2012 | Lazar |
| 2012/0286684 A1 | 11/2012 | Melanson et al. |
| 2013/0002163 A1 | 1/2013 | He et al. |
| 2013/0049631 A1 | 2/2013 | Riesebosch |
| 2013/0154496 A1* | 6/2013 | Maru et al. ............ 315/210 |

FOREIGN PATENT DOCUMENTS

| | | |
|---|---|---|
| JP | 2000-315587 A | 11/2000 |
| JP | 2008-53181 A | 3/2008 |
| JP | 2008-53188 A | 3/2008 |
| WO | 96/05712 A1 | 2/1996 |
| WO | 2010/031169 A1 | 3/2010 |
| WO | 2011/008635 A1 | 1/2011 |
| WO | 2011/045371 A1 | 4/2011 |
| WO | 2011/045372 A1 | 4/2011 |
| WO | 2011/049976 A1 | 4/2011 |
| WO | 2012/007798 A2 | 1/2012 |
| WO | 2012/016221 A2 | 2/2012 |
| WO | 2012/117403 A1 | 9/2012 |
| WO | 2012/128794 A1 | 9/2012 |
| WO | 2013/035045 A1 | 3/2013 |

OTHER PUBLICATIONS

Patterson et al., "Series Input Modular Architecture for Driving Multiple LEDs", IEEE Power Electronics Specialists Conference, Jun. 15-19, 2008, pp. 2650-2656.

Rand et al., "Issues, Models and Solutions for Triac Modulated Phase Dimming of LED Lamps", IEEE Power Electronics Specialists Conference, PESC 2007, Jun. 17-21, 2007, pp. 1398-1404.

Yan et al., "A New TRIAC Dimmable LED Driver Control Method Achieves High-PF and Quality-of-Light", Twenty-Seventh Annual IEEE Applied Power Electronics Conference and Exposition (APEC), Feb. 5-9, 2012, pp. 969-974.

* cited by examiner

FIG. 1 – Prior Art

LED DRIVER WITH HIGH DIMMING COMPATIBILITY WITHOUT THE USE OF BLEEDERS

TECHNICAL FIELD

Embodiments of the present invention relate generally to light-emitting diode ("LED") driver circuits and, more particularly, to dimmer-compatible LED driver circuits

BACKGROUND

LED lighting systems are capable of high light output while consuming significantly less power than that consumed by traditional incandescent bulbs. LEDs require a tightly regulated current supply, however, and thus LED lighting systems require more complex driver electronics than traditional systems in order to supply this current. In addition, LED lighting systems may be designed to interface with existing lighting infrastructure, such as traditional dimmer switches. A typical LED lighting system thus includes one or more LEDs and driver circuitry to power and dim the LEDs.

One such traditional dimmer switch operates via phase dimming, in which a varying portion of a current or voltage (such as an AC mains signal) is removed or "chopped," thereby delivering a variable amount of power to the downstream LEDs. A TRIAC may be used to perform this chopping; the amount of the AC mains that is passed is referred to as the conduction angle, or phase, which may be measured in degrees; the leading edge or the trailing edge of the AC mains may be chopped.

FIG. 1 illustrates a sample circuit 100 for a phase dimmer. A voltage V1 supplies power to the circuit 100, and a resistor R1 represents the variable load of a lamp. A second resistor R2 sets the conduction angle; the resistor R2 may be a variable resistor and may have a resistance ranging from 100 kΩ to 10 MΩ or any other value. When the voltage V1 is below a threshold, the TRIAC U1 does not conduct, and a voltage thereby develops across the resistor R2 and a capacitor C1 (the rate of development being controlled by the sizes of R2 and C1). This developing voltage charges the capacitor C1 until the voltage increases sufficiently to cross the conduction threshold of the TRIAC U1 and a second TRIAC U2. The first TRIAC U1 turns on, allowing larger currents to conduct through the lamp resistance R1. The TRIAC U1 continues to conduct until current no longer flows through it, at which point it resets.

The size of the lamp resistance R1 affects the operation of the phase dimmer circuit 100. A traditional incandescent bulb has a resistance of approximately 240Ω (given a 60 W bulb operating at 120 V) in its steady-state condition, though when the lamp is first turned on its resistance may be much higher. The size of the variable resistance R2 (and of the other components in the circuit 100) can thus be set accordingly to ensure that the circuit 100 operates properly. LEDs, on the other hand, may vary in power consumption from anywhere from 4 W to 20 W, which corresponds to an equivalent resistance ranging from 700Ω to 3600Ω. Furthermore, the drivers for LEDs may not have a purely resistive input characteristic, creating further variation in the equivalent resistance. The deleterious effect of this variation can produce a momentary loss of current in the TRIAC U1, resulting in a mis-firing thereof. The effects of this mis-firing include flickering, shimmering, or other dimming incompatibilities of the LED.

Existing systems reduce or prevent these deleterious effects by adding a so-called "bleeder" circuit to draw current through the TRIAC U1 to prevent its misfiring. For example, a resistor may be switched into the circuit 100 or a semiconductor may be operated in its linear region across the input terminals of the driver or LED. The bleeder circuit may be configured to continually draw current or may be configured to draw current only when the current through the TRIAC U1 falls below a threshold and/or only during certain portions of the input AC mains cycle. In either case, however, the bleeder circuit wastes power by drawing this current. A need therefore exists for an LED driver that prevents TRIAC misfire without consuming unnecessary power.

SUMMARY

In general, various aspects of the systems and methods described herein include switching converters that vary their input equivalent resistances as the state (e.g., conducting or nonconducting) of an upstream dimming circuit (i.e., a dimming circuit supplying a dimming signal to the converter) changes. In one embodiment, the equivalent resistance of the converter changes to a first, higher value when the dimming circuit is conducting and a second, lower value when the dimming circuit is nonconducting, thereby ensuring that a minimum current is drawn from the dimming circuit in its nonconducting state. The minimum current drawn is, in one embodiment, sufficient to keep the dimming circuit from misfiring or exhibiting other deleterious behavior. The overall power drawn from the dimming circuit may be equivalent to that drawn from the dimming circuit if the equivalent resistance remained constant. The emulated resistance is varied in such a way as to meet the minimum conduction current requirements of the dimmer and provide a specific average output power to a load. This average output power can be adjusted to adjust the brightness of the LED, but the control system will regulate an average output power often through regulating an average output current.

In one aspect, a circuit for controlling a switching converter includes an input voltage or phase analyzer for detecting when a dimmer circuit supplying power to the switching converter changes from a conducting state to a nonconducting state or from a nonconducting state to a conducting state; a pulse-width-modulating generator for changing an equivalent input resistance of the switching converter to a first, higher value when the dimmer circuit is in the conducting state and to a second, lower value when the dimmer circuit is in the nonconducting state, thereby drawing a minimum current from the dimmer circuit while the dimmer circuit is in the nonconducting state.

A light-emitting diode may receive an output current generated by the switching converter and is illuminated thereby. The pulse-width-modulating generator may change the equivalent input resistance by changing a frequency or duty cycle of an output control signal that controls switching characteristics of the switching converter. A power drawn from the dimming circuit may be approximately equal to a power drawn by a switching converter having a constant equivalent resistance. A feedback analyzer for may detect a current flowing through a light-emitting diode connected to the switching converter, wherein the pulse-width-modulating generator varies a frequency or duty cycle of an output control signal that controls the switching characteristics of the switching converter based on the current. The pulse-width-modulating generator may change the equivalent input resistance at a first point in time prior to a second point in time at which the state of the dimmer circuit changes. The input voltage or phase analyzer may detect a current spike in an input current and varies the first point in time to reduce the size of the spike or eliminate the spike. The switching converter may be a flyback converter or a high-power-factor converter.

In another aspect, a method for controlling a switching converter includes detecting when a dimmer circuit supplying power to the switching converter changes from a conducting state to a nonconducting state or from a nonconducting state to a conducting state; and changing an equivalent input resistance of the switching converter to a first, higher value when the dimmer circuit is in the conducting state and to a second, lower value when the dimmer circuit is in the nonconducting state, thereby drawing a minimum current from the dimmer circuit while the dimmer circuit is in the nonconducting state.

An output current generated by the switching converter may be supplied to a light-emitting diode. The equivalent input resistance may be changed by changing a frequency or duty cycle of an output control signal that controls switching characteristics of the switching converter. An average power drawn from the dimming circuit may be approximately equal to a power drawn by a switching converter having a constant equivalent resistance. A current flowing through a light-emitting diode connected to the switching converter may be detected, wherein a frequency or duty cycle of an output control signal that controls the switching characteristics of the switching converter is varied based on the current. The equivalent input resistance may be changed at a first point in time prior to a second point in time at which the state of the dimmer circuit changes. A current spike in an input current may be detected and the first point in time may be varied to reduce the size of the spike or eliminate the spike.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
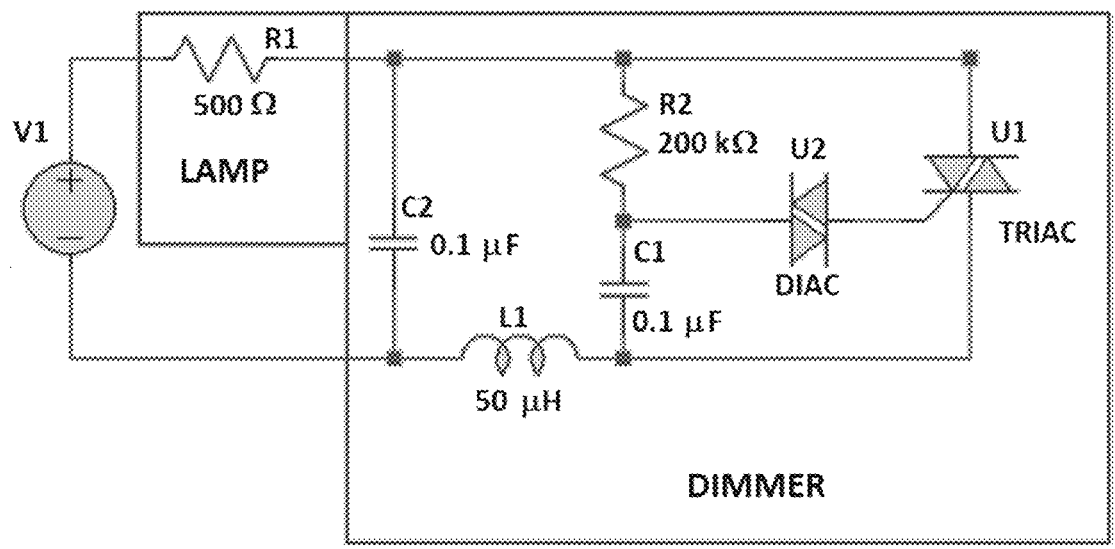
FIG. 1 is a circuit diagram of a conventional dimmer circuit.

Described herein are various embodiments of methods and systems for dimmer-compatible LED driver circuits. In one embodiment, the LED driver circuit includes a switching converter, such as a flyback converter or other high-power-factor converter. The instantaneous input resistance of the LED driver circuit may be determined by dividing the input voltage by the input current at that instant. This input resistance is affected by the resistance and/or reactance of the components therein (such as resistors, inductors, primary winding of transformers, or capacitors) and the switching behavior of the switching converter. At a given instant the input voltage may be 75V and the input current may be 50 mA resulting in an emulated resistance of 1500 ohms and at another instant the input voltage may have changed to 25V while the input current stayed at 50 mA, resulting in an emulated resistance of 500 ohms.

In various embodiments of the present invention, the emulated resistance of a switching converter in an LED driver circuit is dynamically modified in response to changing states of an upstream dimmer circuit (i.e., conducting and nonconducting dimmer states) that supplies a dimming signal to the LED driver circuit in order to ensure that a minimum amount of current is drawn from the dimmer, even when the dimmer is in its nonconducting state. In one embodiment, when the upstream dimmer is conducting, the switching converter in the LED driver circuit is configured to provide a first, larger emulated resistance of the LED driver circuit; when the upstream dimmer is nonconducting, the switching converter is configured to provide a second, smaller emulated resistance.

The value of first, larger emulated resistance (corresponding to the conductive dimmer state) may be determined by configuring the LED driver circuit to provide a desired output current to its load (e.g., one or more LEDs). As one of skill in the art will understand, the output current of the LED driver circuit varies with the frequency and/or duty cycle of a periodic or pulse-width-modulated control signal supplied to the switching converter. A larger duty cycle, for example, may produce a larger output current, and a smaller duty cycle may produce a smaller output current. The duty cycle may be set, either statically or dynamically, to produce the desired output current; the value of the first emulated resistance may correspond to this duty cycle. In other words, the value of the first emulated resistance is derived from the output current requirements of the LED driver circuit and may not does not directly depend on the requirements of the upstream dimmer circuit.

The value of the second, smaller emulated resistance may be determined by the minimum output current required by the upstream dimmer circuit. If, for example, the dimmer circuit requires a minimum current draw of ten milliamps, even when the dimmer is in its nonconductive state, the second emulated resistance may be selected to draw this current.

Figure 2:
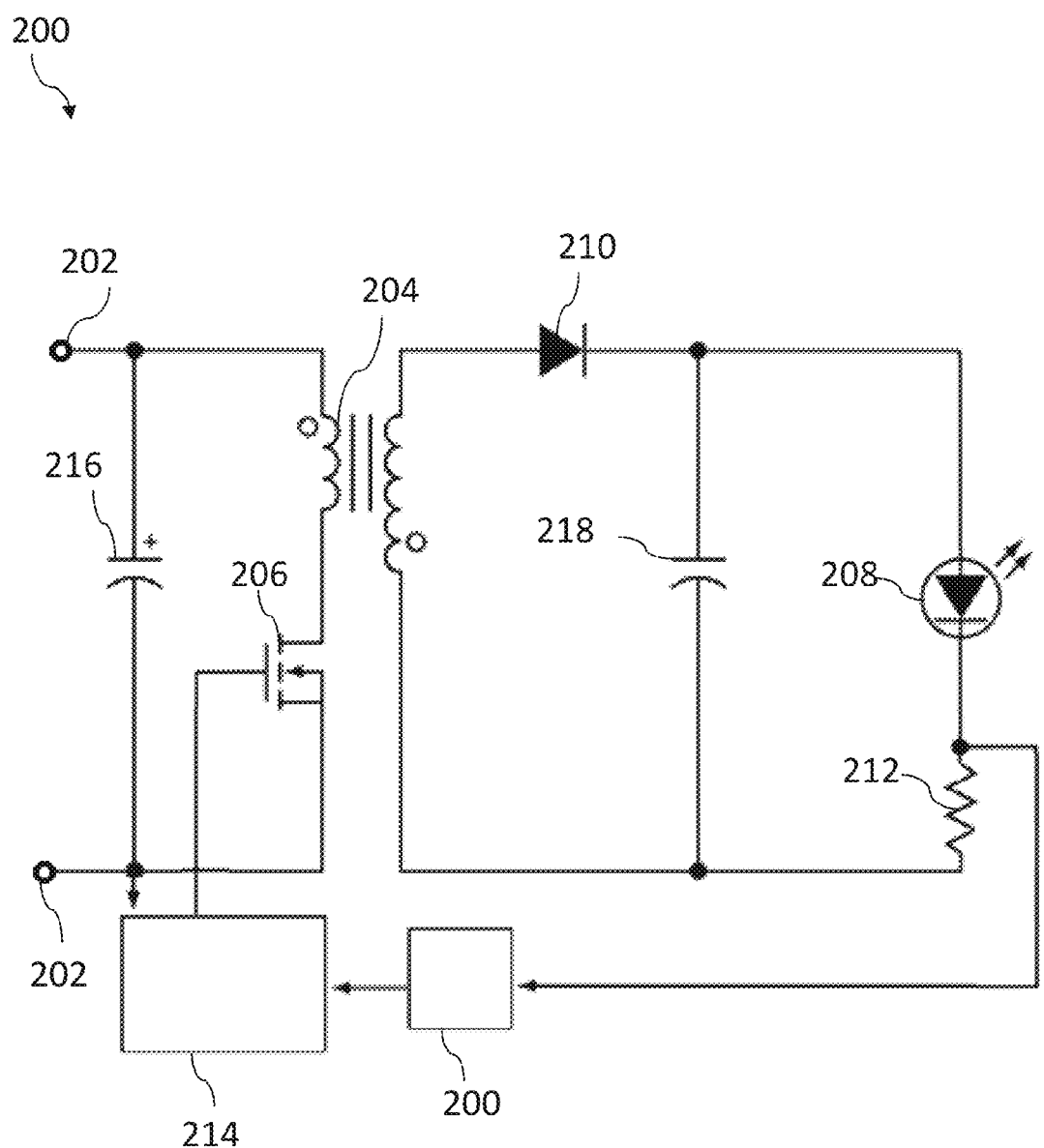
FIG. 2 is a circuit diagram of a switching converter in accordance with embodiments of the present invention.

FIG. 2 illustrates a flyback converter circuit 200 in accordance with embodiments of the present invention; one of skill in the art will understand, however, that embodiments of the present invention are not limited to only flyback converters and may be used with other types of switching converters, including high-power-factor converters, and/or multiple stage converters where the first stage provides an average output voltage or current which is further processed by subsequent stages. An input voltage is received at input ports 202; the input voltage may be provided by an AC mains supply via a bridge rectifier (not shown) or, in other embodiments of the present invention, from an upstream phase-dimming circuit such as the circuit 100 of FIG. 1. An input current flows through a primary winding of a transformer 204 and an FET switch 206. The current in the primary winding of the transformer 204 creates a corresponding current in the secondary winding of the transformer 204. The secondary current is transferred to a load LED 208 via a rectifier diode 210. A current-sense resistor 212 feeds a current-sense signal back to a control circuit 214, possibly via an isolation circuit 216, such as an opto-isolator. The control circuit 214, as explained in greater detail below, generates a control signal that switches the FET switch 206 on and off at different frequencies and/or duty cycles to create a dynamic emulated resistance with respect to the input ports 202 that changes based on a conduction state of an upstream dimmer (if one is present). The control circuit 214 may also receive one or both of the voltages on the input terminals 202 for the purpose of determining the dimmer state. Capacitors 216, 218 may be used to filter the input and output signals.

Figure 3:
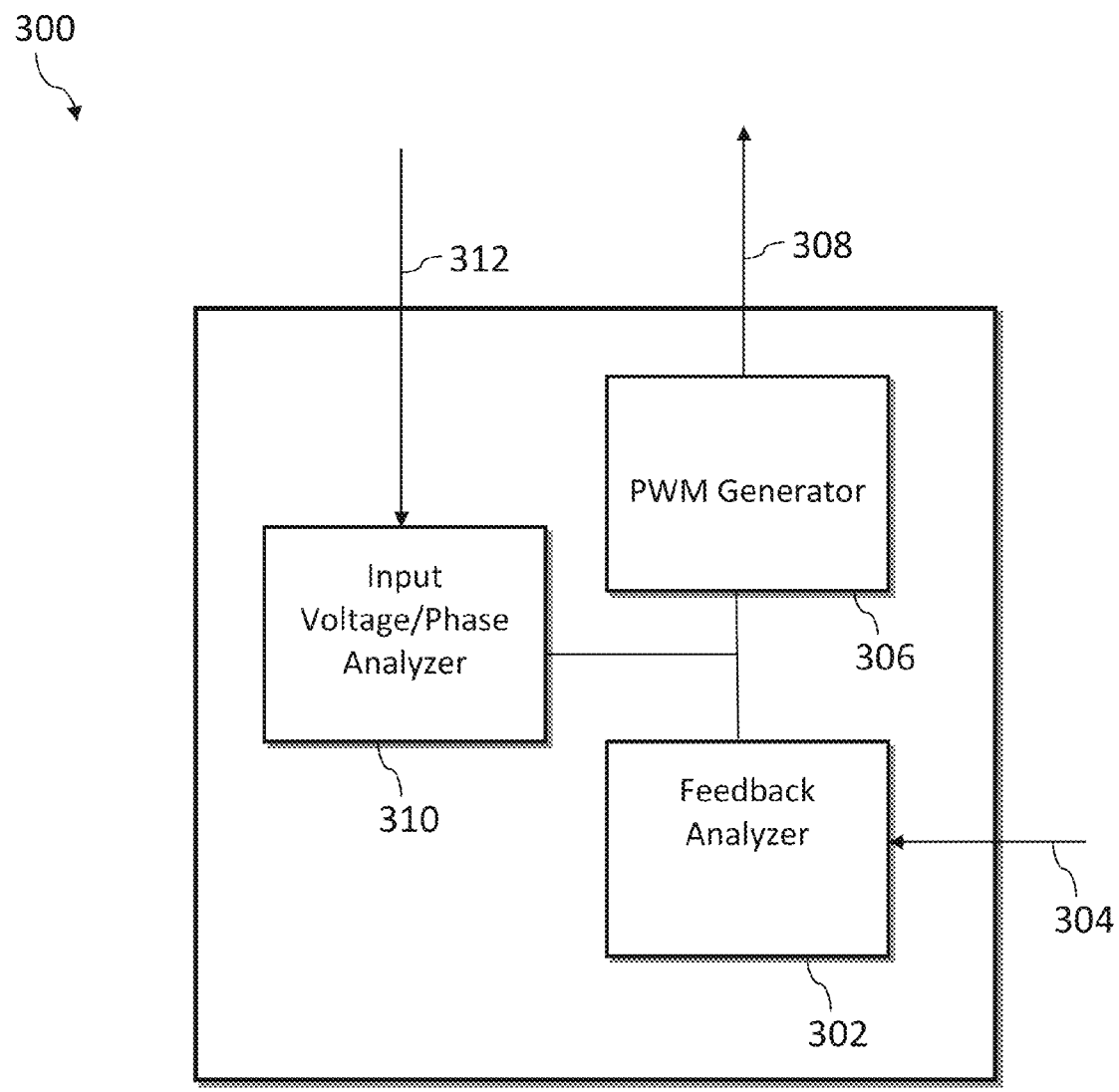
FIG. 3 is a block diagram of a switching controller in accordance with embodiments of the present invention.

FIG. 3 illustrates one embodiment 300 of the of the control circuit 214 of FIG. 2. A feedback analyzer 302 receives a feedback signal 304 indicating a level of output current (such as the signal generated by the current-sense resistor 212 of FIG. 2) supplied to an output load, such as an LED. The feedback analyzer 302 may convert the feedback signal 304 into a voltage, digitize the feedback signal 304, or perform any other sort of signal processing on the feedback signal 304 (such as, e.g., filtering, averaging, or integrating). A pulse-width modulated signal generator 306 generates a pulse-width modulated control signal 308 based on information in the feedback signal 304 as received and/or converted by the feedback analyzer 302. The control signal 308 may be used to control a switch in a switching converter, such as the switch 204 in FIG. 2. The generator 306 may, for example, compare the feedback signal 304 or derivative thereof against a reference current or voltage; if the feedback signal 304 is greater or less than the reference, the generator 306 may increase or decrease the frequency and/or duty cycle of the control signal 308 accordingly.

In one embodiment of the present invention, as mentioned briefly above, the generator 306 causes the control signal 308 to change when an operating mode of an upstream phase dimmer changes (from, e.g., conducting to nonconducting or vice versa). When the upstream dimmer is conducting, the generator 306 causes the control signal 308 to have a frequency and duty cycle that causes a desired current to flow in the LED 208. When the upstream dimmer is nonconducting, the generator 306 causes the control signal 308 to have a frequency and duty cycle such that a lower equivalent resistance is presented to the upstream dimmer to thereby draw a minimum current from the dimmer.

The control circuit 300 may determine when the upstream dimmer changes from a conducting to nonconducting state, or vice versa, in any of a variety of ways. In one embodiment, an input voltage/phase analyzer 310 receives an input power signal 312 (which may be one or both of the input voltages 202). If the input voltage 312 is greater than a threshold (say, 50 V), the input voltage/phase analyzer 310 may determine that an upstream dimmer is in a conducting state; if the input voltage 312 is less than the threshold, the input voltage/phase analyzer 310 may determine that the upstream dimmer is in a nonconducting state. The input voltage/phase analyzer 310 may thus include an analog or digital comparator to compare the input voltage 312 to the threshold. The input voltage/phase analyzer 310 may instead or in addition include a phase detector, phase-locked loop, or similar circuit for determining the phase of the input voltage 312 (i.e., the amount that an upstream dimmer has "chopped" the input voltage 312). The phase of the input voltage 312 may be similarly compared to a threshold, and if the measured phase is greater than a threshold phase (say, 0-2 degrees, wherein a 0 degree phase indicates no dimming), the input voltage/phase analyzer 310 may determine that the upstream dimmer is conducting in one part of the phase and nonconducting in another part of the phase. When the input voltage/phase analyzer 310 detects a change in state, it may send a signal indicating the state change (and/or identifying the new state) to the PWM generator 306, which may then modify the output signal 308 accordingly, as described above.

The control circuit 300 may include digital circuits, analog circuits, or any combination thereof. In various embodiments, the control circuit 300 may be one or more application-specific integrated circuits, digital-signal processors, microcontrollers, programmable grid arrays, custom processors, or any other type of digital circuit. The components 302, 306, 310 may be implemented using the same or different chips; if on the same chip, they may be implemented as wholly or partially discrete components or integrated together into the same components. For example, a series of computer instructions executing on a processor may implement some or all of the functionality of some or all of the components 302, 306, 310. Similarly, discrete digital logic circuits may implement some or all of the components 302, 306, 310. The control circuit 300 may further include other components and functionality; the present invention is not limited to a controller 300 having only the depicted components 302, 306, 310.

Figure 4A:
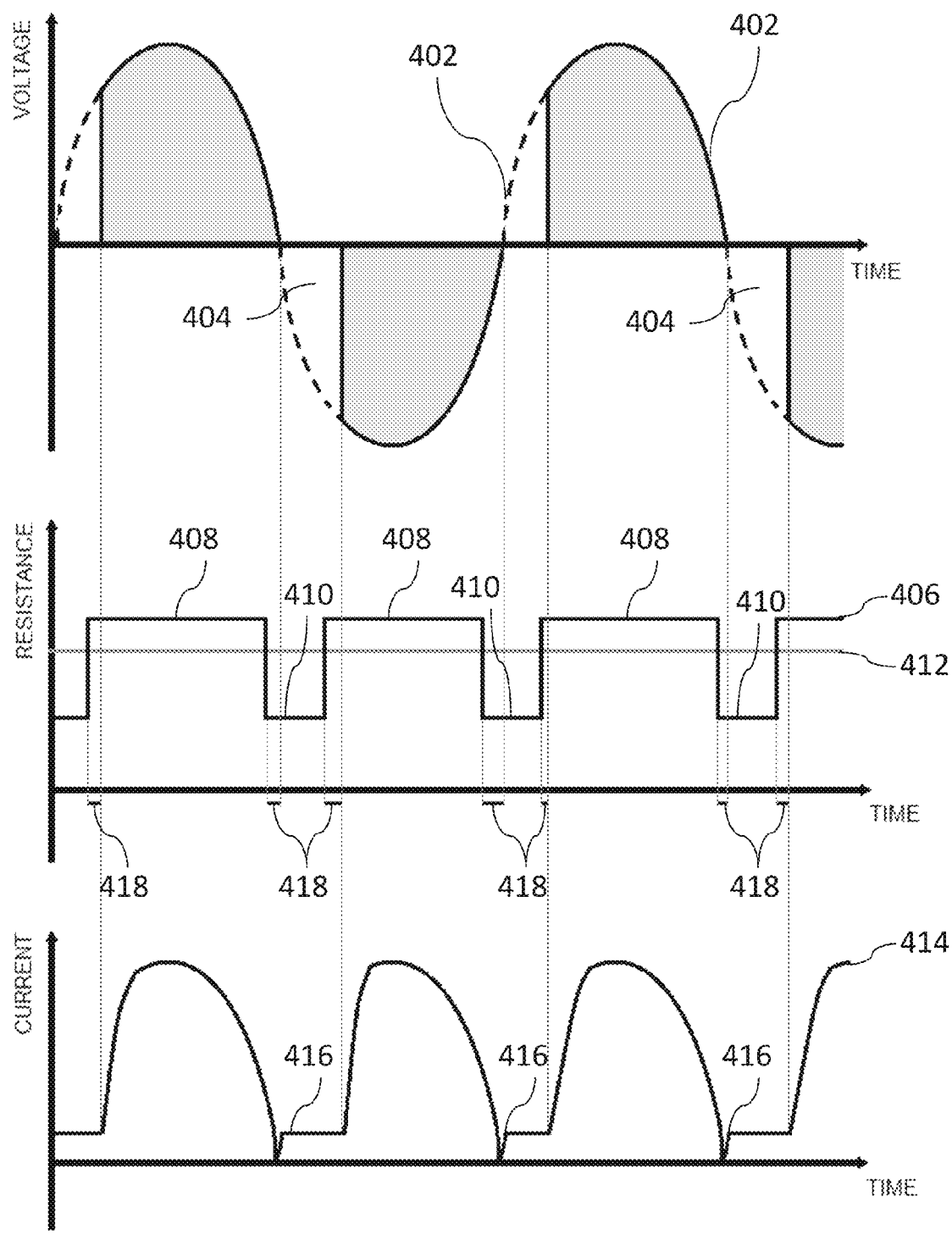
FIGS. 4A, 4B, and 5 are waveforms of input voltages, equivalent resistances, and input currents in accordance with embodiments of the present invention.

FIG. 4A illustrates a series of waveforms in accordance with embodiments of the present invention. An input voltage 402 is received; in this embodiment, the input voltage is a 120 V peak, 60 Hz AC mains voltage, but the present invention is not limited to any particular type of waveform. As shown, the input voltage 402 has been chopped by an upstream phase dimmer such that portions 404 of the input voltage 402 are held to zero (or near zero) volts. The upstream dimmer is in a nonconducting state in the chopped regions 404 and in a conducting state elsewise. As described above, an equivalent resistance 406 of a switching converter varies in accordance with the changing states of the upstream dimmer. When, the dimmer is conducting, the equivalent resistance 406 is a first, higher value 408; when the dimmer is not conducting, the equivalent resistance 408 takes on a second, lower value 410.

The higher value 408 of the equivalent resistance 406 may be higher than a constant equivalent resistance 412, which represents a value of an equivalent resistance in a typical switching converter (i.e., one built using existing means). The higher value 408 of the equivalent resistance 406 may be selected such that the average power drawn from the upstream converter using the dynamic equivalent resistance 406 is equal or approximately equal to (e.g., within 1%, 2%, or 5%) of the average power drawn using the constant equivalent resistance 412.

An input current 414 is shown that corresponds to the input voltage 402 and the equivalent resistance 406. When the dimmer is in a conducting state, the input current 414 varies in accordance with the input voltage 402. When the dimmer is in a nonconducting state, the input current 414 is set at a minimum value 416, as defined by the lower value 410 of the equivalent resistance 412.

In one embodiment, the equivalent resistance 406 changes a certain amount of time 418 before the upstream conductor changes states (as determined by the input voltage 402). The amount of time 418 may be, for example, 2 ms, 1 ms, 0.5 ms, or any other value. The controller 300 may change the equivalent resistance 406 prior to dimmer state changes by predicting when such changes will occur; in one embodiment, the controller 300 includes a phase- or delay-locked loop locked to the phase of the dimmer and which may be used to predict state changes. By changing the equivalent resistance 406 prior to the switching of the state of the dimmer, current spikes in the input current 414 may be eliminated, minimized, or reduced (as explained in greater detail below). The amount of time 418 may be the same for each dimmer state change or may vary. In one embodiment, the controller 300 monitors the input current 414 and tests for the presence of current spikes; if spikes are found, the controller 300 dynamically adjusts the amount of time 418 until the spikes are eliminated or reduced in size past a threshold.

Figure 4B:
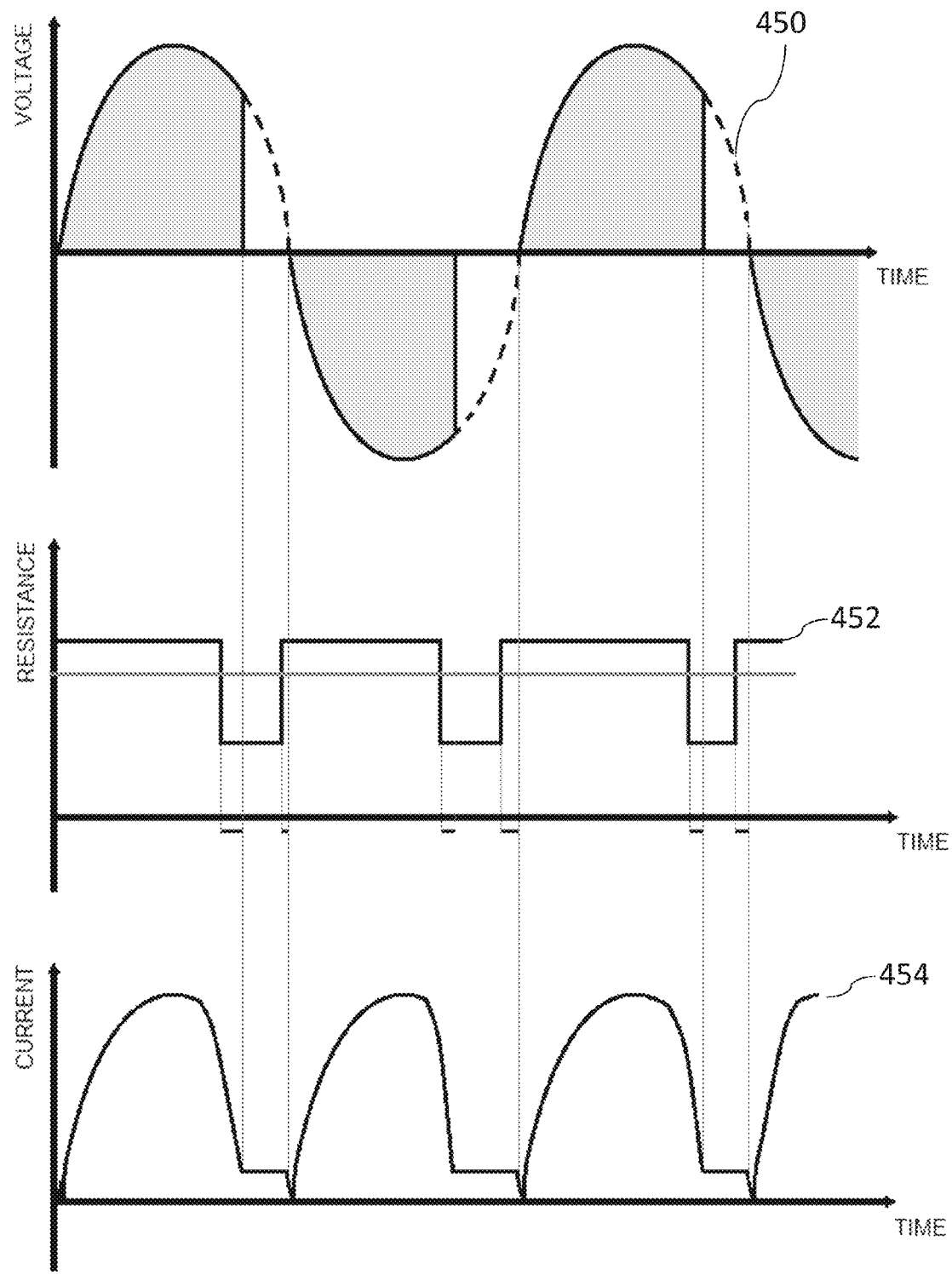
Figure 5:
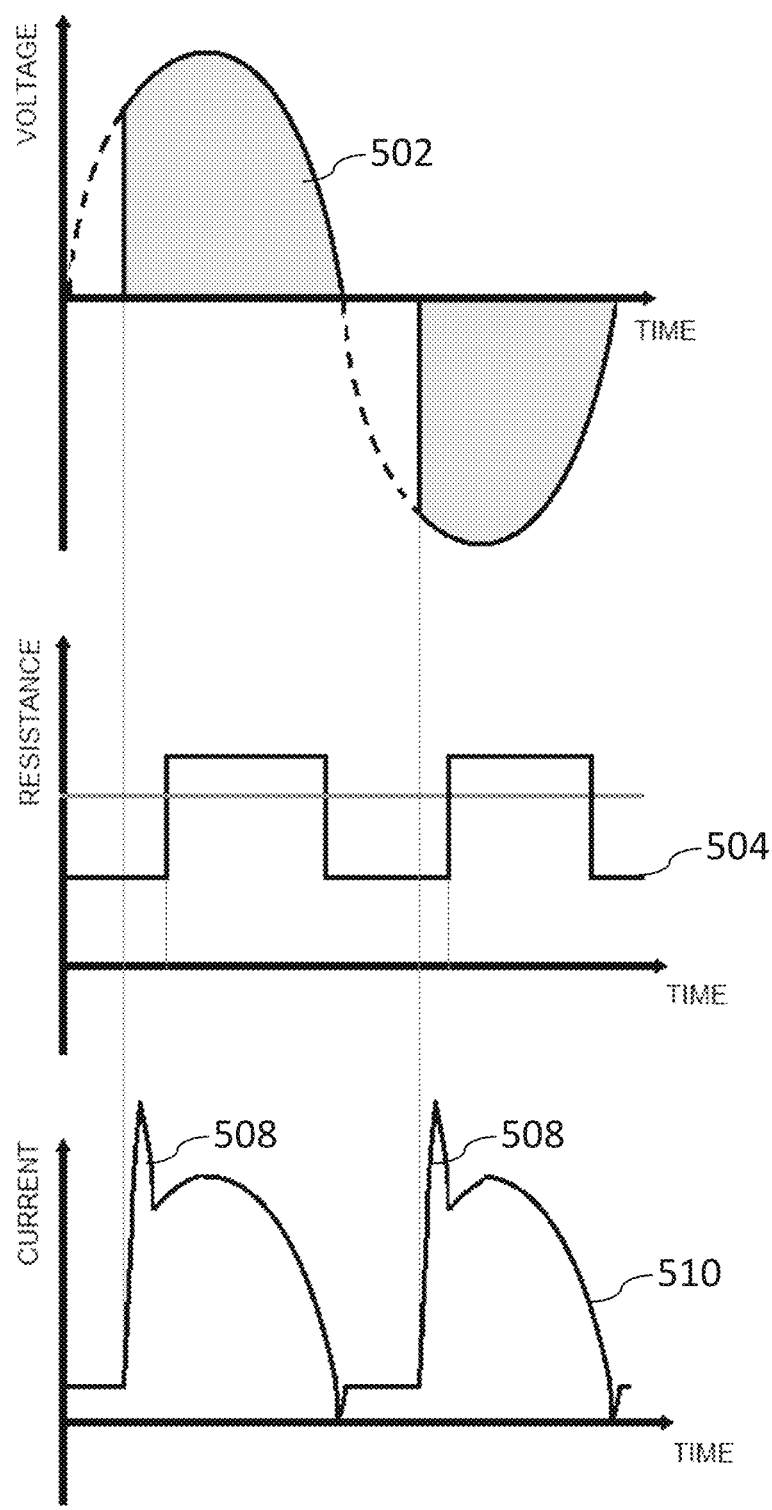

FIG. 4A depicts an input voltage 402 for a leading-edge phase-cut dimmer; FIG. 4B depicts an input voltage 450 for a trailing-edge phase-cut dimmer. The corresponding equivalent resistance 452 and input current 454 for the trailing-edge phase-cut dimmer are generated in accordance with the above discussion. FIG. 5 illustrates an input voltage 502 and an equivalent resistance 504 that switches between low and high resistance states after corresponding changes in dimmer states. As mentioned above, deleterious current spikes 506 may develop in an input current waveform 508 as a result of the equivalent resistance 504 switching after or at the time of switching of the dimmer state.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A circuit for controlling a switching converter, the circuit comprising:
    an input voltage or phase analyzer for detecting when a dimmer circuit supplying power to the switching converter changes from a conducting state to a nonconducting state or from a nonconducting state to a conducting state; and
    a pulse-width-modulating generator for changing an equivalent input resistance of the switching converter to a first, higher value when the dimmer circuit is in the conducting state and to a second, lower value when the dimmer circuit is in the nonconducting state, thereby drawing a minimum current from the dimmer circuit while the dimmer circuit is in the nonconducting state, wherein the pulse-width-modulating generator changes the equivalent input resistance at a first point in time prior to a second point in time at which the state of the dimmer circuit changes.

2. The circuit of claim 1, further comprising a light-emitting diode that receives an output current generated by the switching converter and is illuminated thereby.

3. The circuit of claim 1, wherein the pulse-width-modulating generator changes the equivalent input resistance by changing a frequency or duty cycle of an output control signal that controls switching characteristics of the switching converter.

4. The circuit of claim 1, wherein a power drawn from the dimming circuit is approximately equal to a power drawn by a switching converter having a constant equivalent resistance.

5. The circuit of claim 1, further comprising a feedback analyzer for detecting a current flowing through a light-emitting diode connected to the switching converter, wherein the pulse-width-modulating generator varies a frequency or duty cycle of an output control signal that controls the switching characteristics of the switching converter based on the current.

6. The circuit of claim 1, wherein the input voltage or phase analyzer detects a current spike in an input current and varies the first point in time to reduce the size of the spike or eliminate the spike.

7. The circuit of claim 1, wherein the switching converter is a flyback converter or a high-power-factor converter.

8. A method for controlling a switching converter, the method comprising:
    detecting when a dimmer circuit supplying power to the switching converter changes from a conducting state to a nonconducting state or from a nonconducting state to a conducting state; and
    changing an equivalent input resistance of the switching converter to a first, higher value when the dimmer circuit is in the conducting state and to a second, lower value when the dimmer circuit is in the nonconducting state, thereby drawing a minimum current from the dimmer circuit while the dimmer circuit is in the nonconducting state,
        wherein changing the equivalent input resistance includes changing at a first point in time prior to a second point in time at which the state of the dimmer circuit changes.

9. The method of claim 8, further comprising supplying an output current generated by the switching converter to a light-emitting diode.

10. The method of claim 8, further comprising changing the equivalent input resistance by changing a frequency or duty cycle of an output control signal that controls switching characteristics of the switching converter.

11. The method of claim 8, wherein an average power drawn from the dimming circuit is approximately equal to a power drawn by a switching converter having a constant equivalent resistance.

12. The method of claim 8, further comprising detecting a current flowing through a light-emitting diode connected to the switching converter, wherein a frequency or duty cycle of an output control signal that controls the switching characteristics of the switching converter is varied based on the current.

13. The method of claim 8, further comprising detecting a current spike in an input current and varying the first point in time to reduce the size of the spike or eliminate the spike.

* * * * *